US 6,542,389 B2

(12) United States Patent
Dietrich et al.

(10) Patent No.: US 6,542,389 B2
(45) Date of Patent: Apr. 1, 2003

(54) VOLTAGE PUMP WITH SWITCH-ON CONTROL

(75) Inventors: Stefan Dietrich, Türkenfeld (DE); Patrick Heyne, München (DE); Thilo Marx, Villingen-Schwenningen (DE); Sabine Kieser, Hausham (DE); Michael Sommer, München (DE); Thomas Hein, München (DE); Michael Markert, Augsburg (DE); Torsten Partsch, Chapel Hill, NC (US); Peter Schrögmeier, München (DE); Christian Weis, Germering (DE)

(73) Assignee: Infineon Technology AG, Munich (DE)

( * ) Notice: Subject to any disclaimer, the term of this patent is extended or adjusted under 35 U.S.C. 154(b) by 0 days.

(21) Appl. No.: 10/046,378

(22) Filed: Oct. 19, 2001

(65) Prior Publication Data

US 2002/0075707 A1 Jun. 20, 2002

(30) Foreign Application Priority Data

Oct. 19, 2000 (DE) .......................... 100 51 936

(51) Int. Cl.[7] ................................ H02M 3/07
(52) U.S. Cl. ........................... 363/60; 363/49
(58) Field of Search ................. 363/49, 59, 60

(56) References Cited

U.S. PATENT DOCUMENTS 5,394,320 A * 2/1995 Blodgett .................. 363/60

6,448,841 B1 * 9/2002 Milazzo ................... 363/59
6,466,079 B1 * 10/2002 Kushnarenko ............ 363/60

FOREIGN PATENT DOCUMENTS

| EP | 0 684 686 A2 | 11/1995 | ......... H02M/3/07 |
| FR | 2 759 507 A1 | 8/1998 | ......... H02M/3/07 |
| GB | 2 339 638 A | 2/2000 | ......... H03K/17/06 |
| JP | 2-276465 A | 11/1990 | ......... H02M/3/07 |
| WO | WO 99/03192 | 1/1999 | ......... H02M/3/18 |

* cited by examiner

Primary Examiner—Jeffrey Sterrett
(74) Attorney, Agent, or Firm—Laurence A. Greenberg; Werner H. Stemer; Gregory L. Mayback

(57) ABSTRACT

The voltage pump for generating a boosted output voltage has a switch-on control circuit. The switch-on control includes a transistor that is connected between a terminal for feeding in a supply voltage and the terminal for tapping off the boosted output voltage. After the voltage pump has started to operate, the boosted output voltage is decoupled from the supply voltage by the transistor. A changeover switch forwards the respective higher of the output voltage or supply voltage to the substrate terminal and gate terminal of the transistor. The switch-on control enables early provision of a boosted output voltage in conjunction with reliable start-up operation of the voltage pump, while the additional outlay on circuitry is minimized.

9 Claims, 2 Drawing Sheets

VOLTAGE PUMP WITH SWITCH-ON CONTROL

BACKGROUND OF THE INVENTION

Field of the Invention

The invention relates to a voltage pump with a switch-on control which yields an output voltage boosted beyond the supply voltage.

Voltage pumps are used in integrated circuits in order to generate from the supply voltage fed to the integrated circuit a higher voltage which exceeds the supply voltage. The higher voltage is required by internal functional units within the circuit. By way of example, in integrated semiconductor memories, in particular in dynamic random access memories, so-called DRAMs, the writing and reading access to a memory cell proceeds via an access transistor. To ensure that, during read-out from a memory cell, the relatively small signal which specifies the memory state is read out as far as possible completely and uncorrupted, it is necessary for the access transistor to be completely turned on. For this purpose, the access transistor must be driven with a control voltage in excess of the supply voltage. In accordance with the matrix-like arrangement of the memory cell array divided into rows and columns, a plurality of access transistors are jointly connected to a word line. In the event of access to a row of the memory cell array, the word line drive voltage, whose magnitude exceeds that of the supply voltage, is applied to the word line. In conventional DRAMs, the supply voltage referred to ground (0 V) is about 3.3 V; the word line voltage lies above 3.3 V, being 3.5 V, for example.

The voltage pump is used to generate this boosted output voltage. On the input side, the supply voltage is fed to the voltage pump and the latter outputs the boosted word line voltage on the output side. In voltage pumps, the voltage difference between their input or supply voltage and their output voltage must not be too large. This condition is ensured only in normal operation. During the switch-on of the as supply voltage, however, when the latter rises upward in a ramped fashion, for example, the voltage pump does not have enough power to follow the input or supply voltage. The input voltage of the voltage pump rises more rapidly than the output voltage. Reliability problems arise on transistors. Nowadays, voltage pumps operate reliably from a minimum supply voltage starting at 1.5 V. At a low supply voltage, the voltage pump must be switched off for safety reasons. Nevertheless, the boosted output voltage should be available as early as possible. The operational availability of the voltage pump should therefore be produced as quickly as possible after the application of the supply voltage.

SUMMARY OF THE INVENTION

It is accordingly an object of the invention to provide a voltage pump with switch-on control, which overcomes the above-mentioned disadvantages of the heretofore-known devices and methods of this general type and which is operationally reliable during the run-up of the supply voltage and provides a pumped output voltage as quickly as possible.

With the foregoing and other objects in view there is provided, in accordance with the invention, a voltage pump configuration, comprising:
  a voltage pump;
  a terminal for a supply voltage and a terminal for a boosted output voltage connected to the voltage pump;
  a circuit configuration connected to the voltage pump for controlling a switch-on of the voltage pump, the circuit configuration including:
    a first transistor having a controlled path connected between the terminal for the supply voltage and the terminal for the boosted output voltage, and with a substrate terminal and a control terminal;
    a changeover switch having an input side connected to the terminal for the supply voltage and the terminal for the boosted output voltage and an output connected to the substrate terminal of the first transistor and coupled to the control terminal of the first transistor, the changeover switch selectively connecting the terminal for the supply voltage or the terminal for the boosted output voltage to the output;
    a second transistor having a controlled path connected between to the output of the changeover switch and the control terminal of the first transistor;
    a third transistor having a controlled path connected between a terminal for a reference-ground potential and the control terminal of the first transistor; and
    a terminal for a control signal, wherein the voltage pump and the second and third transistors can be switched in dependence on the control signal. In other words, the objects of the invention are achieved by means of a voltage pump with a switch-on control that comprises: a terminal for a supply voltage, a terminal for a boosted output voltage, a circuit configuration for the switch-on control of the voltage pump, in turn comprising: a first transistor, whose controlled path is connected between the terminal for the supply voltage and the terminal for the boosted output voltage, and which has a substrate terminal and a control terminal, a changeover switch, which, on the input side, is connected to the terminal for the supply voltage and the terminal for the boosted output voltage and has an output, which is connected to the substrate terminal of the first transistor and is coupled to the control terminal of the first transistor, and by which the terminal for the supply voltage or the terminal for the boosted output voltage can optionally be connected to its output, a second transistor, whose controlled path is connected between the output of the changeover switch and the control terminal of the first transistor, a third transistor, whose controlled path is connected between a terminal for a reference-ground potential and the control terminal of the first transistor, and a terminal for a control signal, depending on which the voltage pump and the second and third transistors can be connected.

The switch-on control in the voltage pump according to the invention ensures that until the operational availability of the voltage pump is reached, that is to say with a sufficiently high output voltage for reliable operation of the voltage pump is present, the output for the boosted voltage is precharged with the externally applied supply voltage. The voltage pump (or a plurality of voltage pumps in the case of parallel operation) is (are) then connected in. In this case, it is necessary to decouple the terminal for the boosted pump voltage from the supply voltage that is fed in externally. This is achieved in the switch-on control according to the invention by the first transistor which is connected between the terminal for the external supply voltage and the terminal for the pumped output voltage and is driven correspondingly.

In accordance with an added feature of the invention, the substrate terminal of the first transistor is advantageously controlled by a changeover switch which, when the external supply voltage is forwarded to the output, connects the external supply voltage to the substrate terminal and, when the external supply voltage is decoupled from the output, forwards the pumped output voltage to the substrate terminal. In these cases, the substrate terminal of the first transistor is respectively at the higher of the voltage fed in externally or the pumped output voltage. The first transistor is preferably a p-channel MOS transistor arranged in an n-doped well. The driving of the substrate terminal or of the well wherein the substrate of the first transistor is arranged prevents current from flowing away from the source/drain terminals of the transistor into the well.

The two inputs of the changeover switch are connected to the terminals of the controlled current path of the first transistor. On the output side, the changeover switch is connected to the substrate terminal or the well terminal of the first transistor. The transistors of the changeover switch are p-channel MOS transistors. Their gate terminals are cross-connected to the input terminals of the input switch. This means that the gate terminal of the transistor connected to one input terminal of the changeover switch is connected to the respective other input.

The control signal which specifies the operational availability of the voltage pump drives a second transistor, which connects the control terminal of the first transistor to reference-ground potential (ground) when the charge pump has become ready for operation. Otherwise, said second transistor is turned off. The output of the changeover switch, which carries the pumped output voltage in this operating state, is then applied via a third transistor to the control terminal of the first transistor. The effect thereby achieved is that the terminal for the external supply voltage is decoupled from the terminal for the pumped output voltage—as already explained above.

The second transistor is a transistor of the other channel type, that is to say an n-channel MOS transistor. The third transistor is of the same type as the transistors of the changeover switch or of the first transistor, that is to say a p-channel MOS transistor. The second and third transistors are driven simultaneously by the signal which specifies the operational availability of the voltage pump, and are therefore optionally turned on or turned off.

The signal which controls the operational availability of the voltage pump is generated from a logic circuit, to which are fed, on the input side, control signals again indicating the operating state. Thus, there are fed to this logic circuit a second control signal, which indicates that the integrated circuit is actually ready for operation, and a third control signal, which indicates that the minimum voltage for reliable operation of the voltage pump has been reached. The first control signal, which controls the operational availability of the voltage pump, is generated from the two signals by suitable logic elements. In detail, in the logic device, the first control signal is fed to an inverter applied to the first input of a NOR gate. The third control signal is applied directly to a second input of the NOR gate. The output of the logic device is formed by the output of the NOR gate.

The primary achievement of the novel voltage pump with switch-on control is that the pumped output voltage can be provided as early as possible after the application of the supply voltage, but the voltage pump is nevertheless switched on only when a sufficiently high minimum operating voltage is applied externally to the integrated circuit. The switch-on control requires only relatively few components and is therefore distinguished by a small space requirement in an integrated realization. This means that the layout of the switch-on control is relatively simple.

Other features which are considered as characteristic for the invention are set forth in the appended claims.

Although the invention is illustrated and described herein as embodied in a voltage pump with switch-on control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
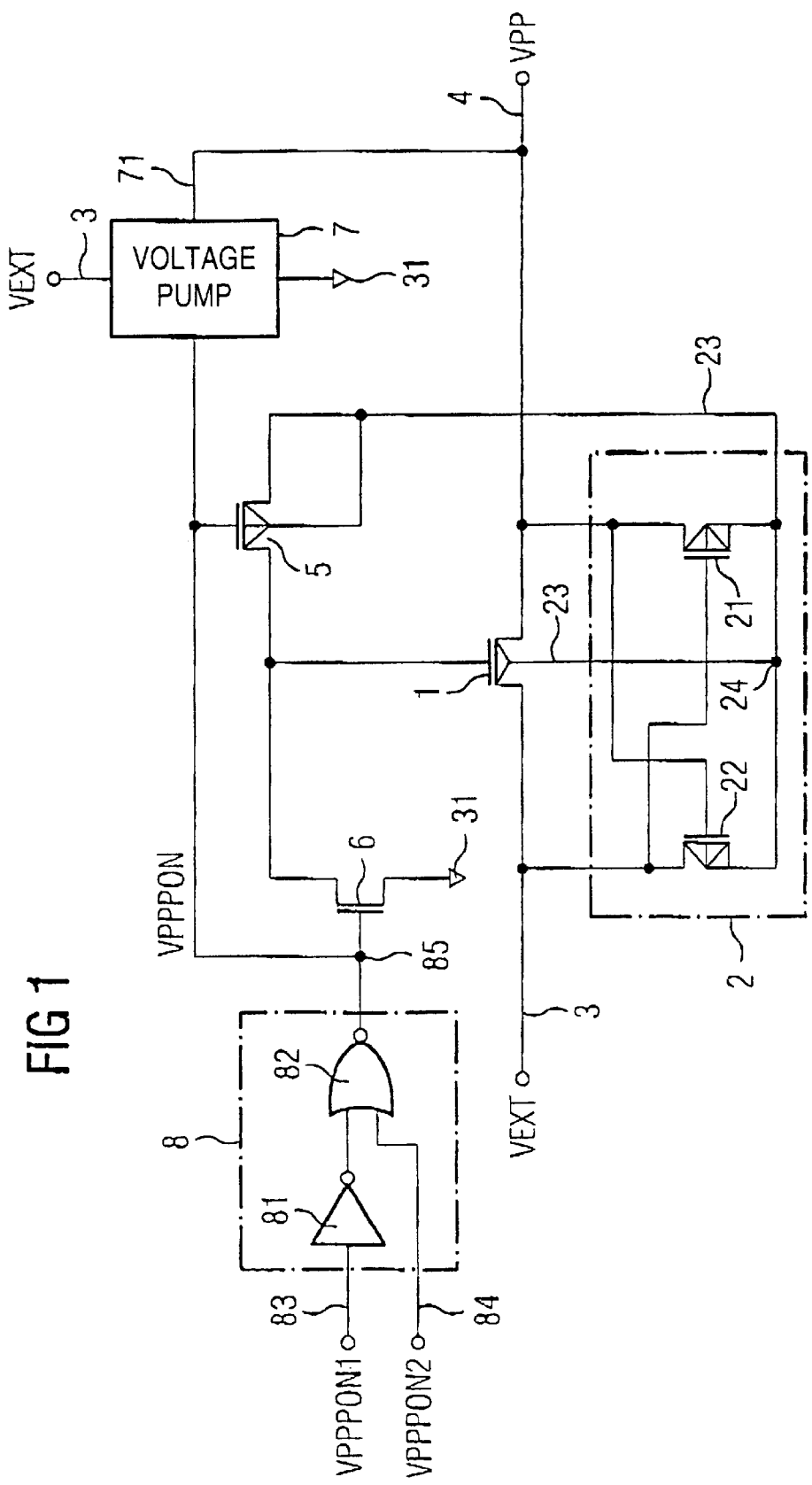
FIG. 1 shows one embodiment of an output pump according to the invention.

Referring now to the figures of the drawing in detail and first, particularly, to FIG. 1 thereof, there is shown a voltage pump 7, which is driven by a circuit configuration for switch-on control. An external supply voltage VEXT is fed to the voltage pump 7. The supply voltage VEXT can be fed in externally at a terminal 3 of the integrated circuit that contains the circuit configuration. The external supply voltage has a value of 3.3 V, for example, and is referred to reference-ground potential of 0 V, which is provided by a ground terminal 31. In steady-state operation of the voltage pump, an output terminal 71 of the voltage pump 7 provides a voltage VPP at a terminal 4 which exceeds the supply voltage VEXT. By way of example, the voltage VPP is 3.5 V. Also by way of example, the word lines of a DRAM are driven by the boosted pump voltage VPP, which is provided to the remaining functional units of the integrated circuit at a terminal. The voltage pump 7 starts to operate when the control signal VPPPON fed to it assumes a high level.

The terminal for feeding in the supply potential VEXT is coupled to the terminal 4 for tapping off the boosted output voltage VPP via a switching transistor 1. The transistor 1 is a p-channel MOS transistor. The controlled path of the transistor 1, which path connects the source/drain doping regions, is connected between the terminals 3 and 4. Moreover, the inputs of a changeover switch 2 are connected to the terminals, the output 23 of which changeover switch is connected to the substrate terminal of the transistor 1. By means of the changeover switch 2—depending on the switching state—either the external supply voltage VEXT present at the terminal 3 or the boosted pump voltage VPP present at the output terminal 4 is forwarded, on the output side, to its terminal 23 and fed to the substrate terminal of the transistor 1. The gate terminal of the transistor 1 can be connected to the reference-ground potential terminal 31 via an n-channel MOS transistor 6. The control terminal, i.e. the gate terminal, of the transistor 6 is controlled by the signal VPPPON. Furthermore, the output 23 of the changeover switch 2 is connected to the gate terminal of the transistor 1 via a p-channel MOS transistor 5. The transistor 5 is likewise controlled by the signal VPPPON. The transistors 5, 6 are complementarily turned on and turned off, respectively, or turned off and turned on, respectively.

The overall effect brought about by the circuitry of the transistor 1, on the one hand on the current path side by the changeover switch 2 and on the other hand on the gate side by the transistors 5, 6, is that when the voltage pump 7 is not yet in operation and the control signal VPPPON assumes a high level, the transistor 5 is in the off state and the transistor 6 is in the on state and connects the gate terminal of the transistor 1 to the ground terminal 3. The transistor 1 is then in the on state and supplies the output terminal 4 with the external supply voltage VEXT from the terminal 3.

When the voltage pump 7 is in operation, which is indicated by a low level of the control signal VPPPON, the transistor 5 is in the on state and the transistor 6 is in the off state. The changeover switch 2 forwards the external supply voltage VEXT at the terminal 3 via its output 23 and the turned-on transistor 5 to the gate terminal of the transistor 1. The transistor 1 is then turned off and the boosted output voltage VPP generated by the voltage pump 7 is present at the output terminal 4. The changeover switch 2 then connects the terminal 4 to its output 23. The boosted output voltage VPP is additionally present at the substrate terminal 23 of the transistor 1.

Figure 2:
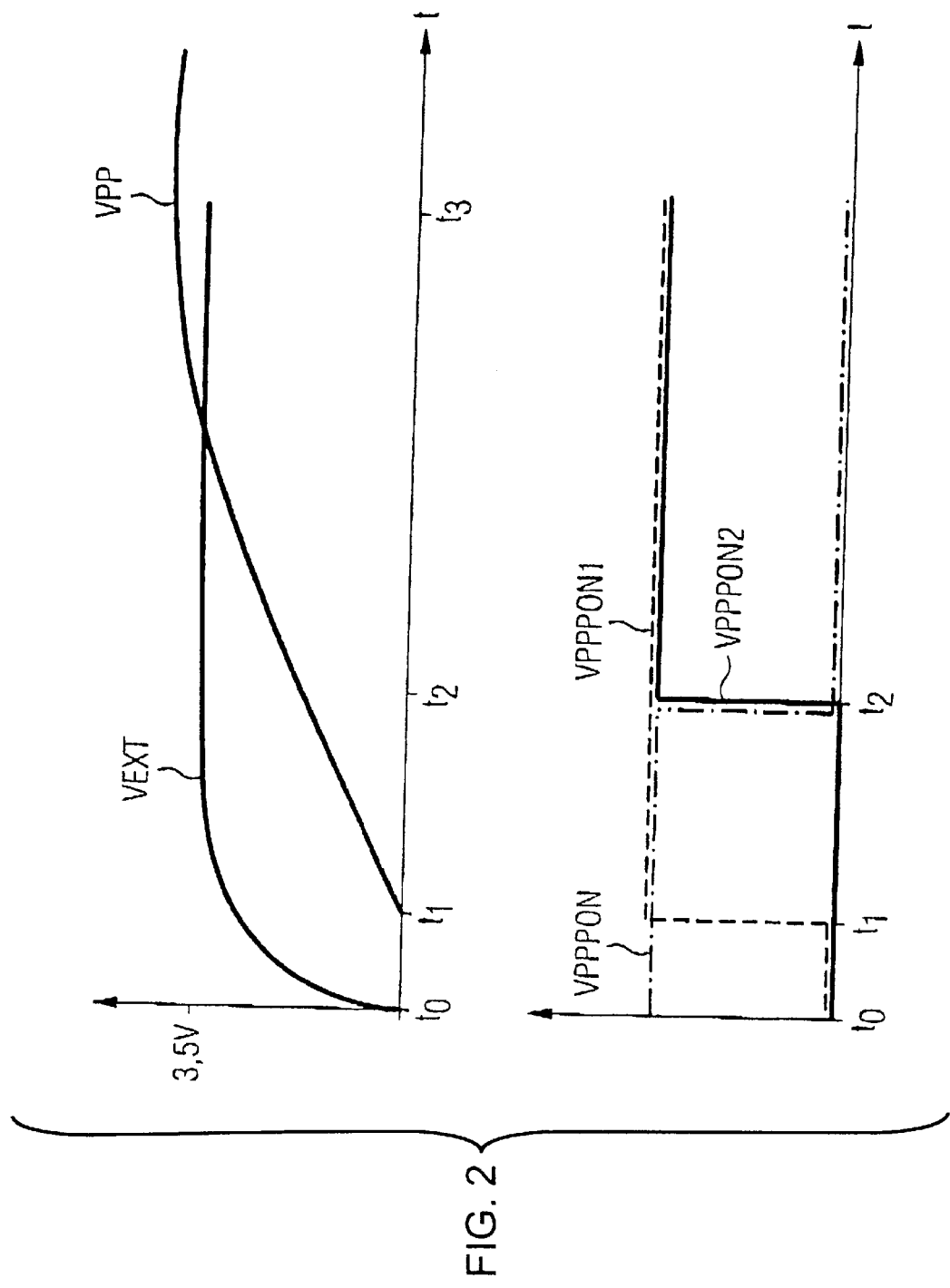
FIG. 2 contains two graphs with time profiles of voltages and signals in the circuit of FIG. 1.

The signal profiles of the supply voltage VEXT fed in externally and of the boosted output voltage VPP to be generated on the output side, as well as the control signals VPPPON1 and VPPPON2 are illustrated in FIG. 2. At the instant t0, the supply voltage VEXT is switched on and rises up to its maximum value of 3.5 V. If the supply voltage VEXT has reached a threshold value at the instant t1, the signal VPPPON1 is activated. During this time, the transistor 1 is switched on and charges the output terminal 4 via the voltage input terminal 3. If the distance between output voltage VPP and input voltage VEXT has reached a sufficiently small value at the instant t2, the control signal VPPPON2 is activated, with the result that the voltage pump 7 starts and the output terminal 4 is now supplied by the output 71 of the voltage pump 7. The output voltage VPP rises and lies above the supply voltage VEXT in the steady-state condition t3.

In detail, the changeover switch 2 has a first p-channel MOS transistor 22, whose controlled path is connected between the terminal 3 and a common node 24, which, at the same time, also forms the output 23 of the changeover switch 2. The controlled path, i.e. the drain-source path, of a further p-channel MOS transistor 21 is connected between the terminal 4 and the common node 24. The gate terminal of the transistor 22 is connected to the drain terminal of the transistor 21, or the input of the changeover switch 2 which is connected to the terminal 4. The gate terminal of the transistor 21 is connected to the drain terminal of the transistor 22, or to the input of the changeover switch 2 which is connected to the terminal 3. The gate terminals of the transistors 21, 22 are therefore cross-coupled to the drain terminals. The changeover switch 2 adjusts itself in such a way that in each case the higher of the voltages VEXT or VPP present on its input side is forwarded to the output 23.

The circuit is implemented in a p-type substrate, for example. The p-channel transistors 21, 22 lie in an n-type well in this case. The n-type well is connected to the common node 24.

The control signal VPPPON for driving the voltage pump 7 is generated by a logic device 8 at its output 85. The terminal 85 is connected to the gate terminals of the transistors 5, 6 and also to the corresponding control input of the voltage pump 7. On the input side at a terminal 83, a control signal VPPPON1 is fed to the logic device. The control signal VPPPON1 indicates that the supply voltage is applied to the circuit and the switch-on operation (power-on) is beginning. A further control signal VPPPON2 is fed in at another input 84 of the logic circuit 8. The control signal VPPPON2 indicates that the output voltage VPP has reached a sufficiently high minimum value, so that the voltage pump 7 can start to operate. In detail, the logic device 8 has an inverter 81, which is connected to the terminal 83 on the input side. Moreover, the logic device 8 has a NOR gate 82, which, on the input side, is connected to the output of the inverter 81 and also to the terminal 84. The output 85 of the logic circuit 8 is formed by the output of the NOR gate 82. The transistor 1 is arranged as a p-channel MOS transistor in an n-type well in the semiconductor substrate of the integrated circuit. The output 23 of the changeover switch 2 puts the well terminal in each case at the higher of the supply voltages VEXT or VPP provided at the output 4. Any leakage currents between the drain/source regions of the transistor 1 and the well region are avoided as a result.

The illustrated drive circuit has only five transistors and also the outlay for the logic circuit 8. Overall, the additional component requirement for the switch-on control is relatively low. The circuit shown affords the advantage that the output voltage VPP provided at the terminal is already precharged to the external supply voltage VEXT immediately after switch-on and afterward, when the minimum voltage is reached for reliable operation of the voltage pump 7, is supplied by the pump voltage provided by the voltage pump on the output side, the output terminal 4 being decoupled from the voltage terminal 3 via the transistor 1. A pumped, boosted output voltage is provided as rapidly as possible, the operation of the voltage pump 7 nevertheless proceeding under reliable boundary conditions.

We claim:

1. A voltage pump configuration, comprising:
    a voltage pump;
    a terminal for a supply voltage and a terminal for a boosted output voltage connected to said voltage pump;
    a circuit configuration connected to said voltage pump for controlling a switch-on of said voltage pump, said circuit configuration including:
        a first transistor having a controlled path connected between said terminal for the supply voltage and said terminal for the boosted output voltage, and with a substrate terminal and a control terminal;
        a changeover switch having an input side connected to said terminal for the supply voltage and said terminal for the boosted output voltage and an output connected to said substrate terminal of said first transistor and coupled to said control terminal of said first transistor, said changeover switch selectively connecting said terminal for the supply voltage or said terminal for the boosted output voltage to said output;
        a second transistor having a controlled path connected between said output of said changeover switch and said control terminal of said first transistor;
        a third transistor having a controlled path connected between a terminal for a reference-ground potential and said control terminal of said first transistor; and
        a terminal for a control signal, wherein said voltage pump and said second and third transistors can be switched in dependence on the control signal.

2. The voltage pump according to claim 1, wherein said changeover switch has at least two transistors with controlled paths each connected between a respective terminal of said controlled path of said first transistor and said output of said changeover switch and with control terminals cross-connected to terminals of said controlled path of said first transistor.

3. The voltage pump configuration according to claim 2, wherein said at least two transistors of said changeover switch have substrate terminals connected to said output of said changeover switch.

4. The voltage pump configuration according to claim 2, wherein said substrate terminal of the first transistor is connected to said output of said changeover switch.

5. The voltage pump configuration according to claim 2, wherein said at least two transistors of said changeover switch and said first transistor are p-channel MOS transistors.

6. The voltage pump configuration according to claim 1, wherein said second transistor and said third transistor are MOS transistors of a mutually complementary channel type.

7. The voltage pump configuration according to claim 6, wherein said second transistor is a p-channel MOS transistor and said third transistor is an n-channel MOS transistor.

8. The voltage pump configuration according to claim 1, which further comprises a logic circuit having an output connected to said terminal for the control signal and having an input side connected to receive a second control signal indicating that the supply voltage is applied, and a third control signal indicating that the boosted output voltage has reached a minimum operating value at which said voltage pump is ready for operation.

9. The voltage pump configuration according to claim 8, wherein said logic circuit has an inverter with an input for receiving the second control signal and an output, and a NOR gate having an input side connected to said output of said inverter and receiving the third control signal and an output side forming said terminal for the control signal.

* * * * *